US010009820B2

(12) United States Patent
Bos (10) Patent No.: US 10,009,820 B2
(45) Date of Patent: Jun. 26, 2018

(54) TRANSFERRING FROM A CELLULAR NETWORK TO ASYNCHRONOUS COMMUNICATIONS (71) Applicant: BlackBerry Limited, Waterloo (CA)

(72) Inventor: Jeffrey Charles Bos, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 155 days.

(21) Appl. No.: 14/991,455

(22) Filed: Jan. 8, 2016

(65) Prior Publication Data
US 2017/0201924 A1 Jul. 13, 2017

(51) Int. Cl.
H04W 4/00 (2018.01)
H04W 36/30 (2009.01)
H04L 5/14 (2006.01)
H04M 7/00 (2006.01)
H04W 24/08 (2009.01)

(52) U.S. Cl.
CPC .............. *H04W 36/30* (2013.01); *H04L 5/14* (2013.01); *H04M 7/006* (2013.01); *H04W 24/08* (2013.01)

(58) Field of Classification Search
CPC ........ H04W 36/30; H04W 24/08; H04L 5/14; H04M 7/006
See application file for complete search history.

(56) References Cited

U.S. PATENT DOCUMENTS

| 6,477,150 | B1 * | 11/2002 | Maggenti | H04L 69/04 370/312 |
| 7,085,560 | B2 | 8/2006 | Petermann | |
| 7,590,055 | B2 | 9/2009 | Segel | |
| 7,817,982 | B1 * | 10/2010 | Chu | G08B 27/006 379/45 |
| 2005/0174935 | A1 | 8/2005 | Segel | |
| 2009/0257345 | A1 | 10/2009 | King | |
| 2011/0246983 | A1 | 10/2011 | Brunet | |
| 2014/0328173 | A1 * | 11/2014 | Lake | H04L 47/15 370/231 |
| 2015/0009865 | A1 * | 1/2015 | Sharma | H04L 5/16 370/277 |

FOREIGN PATENT DOCUMENTS

WO 2004064310 7/2004

OTHER PUBLICATIONS

Canadian Intellectual Property Office, International Search Report and Written Opinion for PCT/CA2016/051542 dated Jan. 23, 2017 (8 pages).

(Continued)

*Primary Examiner* — Ayaz Sheikh
*Assistant Examiner* — Hai-Chang Hsiung
(74) *Attorney, Agent, or Firm* — Trop, Pruner & Hu, P.C.

(57) ABSTRACT

In some examples, a wireless device communicates in a communications session over a cellular network with a remote endpoint device. The wireless device detects a condition indicating potential loss of wireless connectivity or actual loss of wireless connectivity with the cellular network. In response to the detecting, communication with the remote endpoint device is transferred to a communication path including a service that supports asynchronous communications.

15 Claims, 4 Drawing Sheets (56) References Cited

OTHER PUBLICATIONS

Cisco, Cisco 3900 Series, 2900 Series, and 1900 Series Software Configuration Guide—Configuring Backup Data Lines and Remote Management downloaded Dec. 2, 2015 (15 pages).
opengear.zendesk.com—Automatic failover to alternate broadband, cellular or dial-out Internet connection, Jan. 17, 2013 (2 pages).
Brandenburg, Michael, When the wire lets you down: Using 3G and 4G for wireless WAN backup downloaded Dec. 16, 2015 (4 pages).
Sadler, Don, Software Advice—Blogs—Hello Operator—3 Ways to Keep your VoIP Service from going down with the Internet, Dec. 3, 2013 (4 pages).

* cited by examiner

TRANSFERRING FROM A CELLULAR NETWORK TO ASYNCHRONOUS COMMUNICATIONS

BACKGROUND

User equipments (UEs) are able to establish wireless communications with other endpoints over cellular communications networks. A cellular communications network can include cellular access network nodes that provide respective coverage areas. A UE that is within a particular coverage area is able to establish a wireless connection with the corresponding cellular access network node.

BRIEF DESCRIPTION OF THE DRAWINGS

Some implementations of the present disclosure are described with respect to the following figures.

DETAILED DESCRIPTION

Different cellular access technologies can be employed by cellular communications networks. A cellular communications network (or more simply, a "cellular network") refers to a communications network in which respective coverage areas (referred to as "cells") are provided by corresponding cellular access network nodes. User equipments (UEs) can move between the cells and establish respective wireless connections with corresponding cellular access network nodes as the UEs move to different cells.

An example type of cellular access technology is according to the Long-Term Evolution (LTE) standards, which are implemented by the Third Generation Partnership Project (3GPP). The LTE standards are also referred to as the Evolved Universal Terrestrial Radio Access (E-UTRA) standards. The LTE wireless access technology is a fourth generation (4G) wireless access technology that is capable of supporting voice calls and data communications over wireless links. A "voice call" can refer to a communications session in which at least one user speaks to another party, which can be another user or a machine (e.g. voice answering systems). Examples of data communications include web browsing, e-mail communications, file transfer or download communications, and other communications in which data is transmitted from one endpoint to another endpoint.

Although reference is made to LTE in the ensuing discussion, it is noted that techniques or mechanisms according to some implementations can be applied to other wireless access technologies, including other 4G wireless access technologies, or fifth generation (5G) or later cellular access technologies, or second generation (2G) or third generation (3G) cellular access technologies.

Examples of UEs include mobile telephones, smart phones, portable computers, tablet computers, wearable devices (e.g. smart watches, smart eyeglasses, etc.), game appliances, vehicles, and so forth. More generally, reference can be made to "wireless devices," where a wireless device can include a UE or any other type of electronic device that is capable of communicating wirelessly using a cellular network.

Due to poor wireless signal quality, a UE may experience service interruption during a communications session with another endpoint device over a cellular network. For example, a UE may move to a region near the edge of a cell, where the signal strength of wireless signals between the corresponding cellular access network node and the UE can be weak. Also, there can be obstructions (e.g. buildings, trees, hills, etc.) that can degrade communications of wireless signals between a cellular access network node and the UE. Also, interference from other wireless sources, such as wireless communications between other UEs and respective cellular access network node(s) can also result in poor wireless connections.

Due to the service interruption, a user of the UE that is in a voice call may no longer be able to talk with the user of the other endpoint device. In situations where poor wireless connections can last a relatively long period of time, the user of the UE may experience a communications outage for the corresponding time duration.

In accordance with some implementations of the present disclosure, an asynchronous communications service is provided to support backup communications between the UE and a remote endpoint device in case a wireless connection between the UE and a cellular network is lost or potentially may be lost. As used here, an "asynchronous communications service" can refer to machine-readable instructions executable to support asynchronous communications, or alternatively, can refer to a combination of machine-readable instructions and a server (in which the machine-readable instructions are executable) to support asynchronous communications. A server can be implemented as a computer system, or as a distributed arrangement of computer systems.

Figure 1:
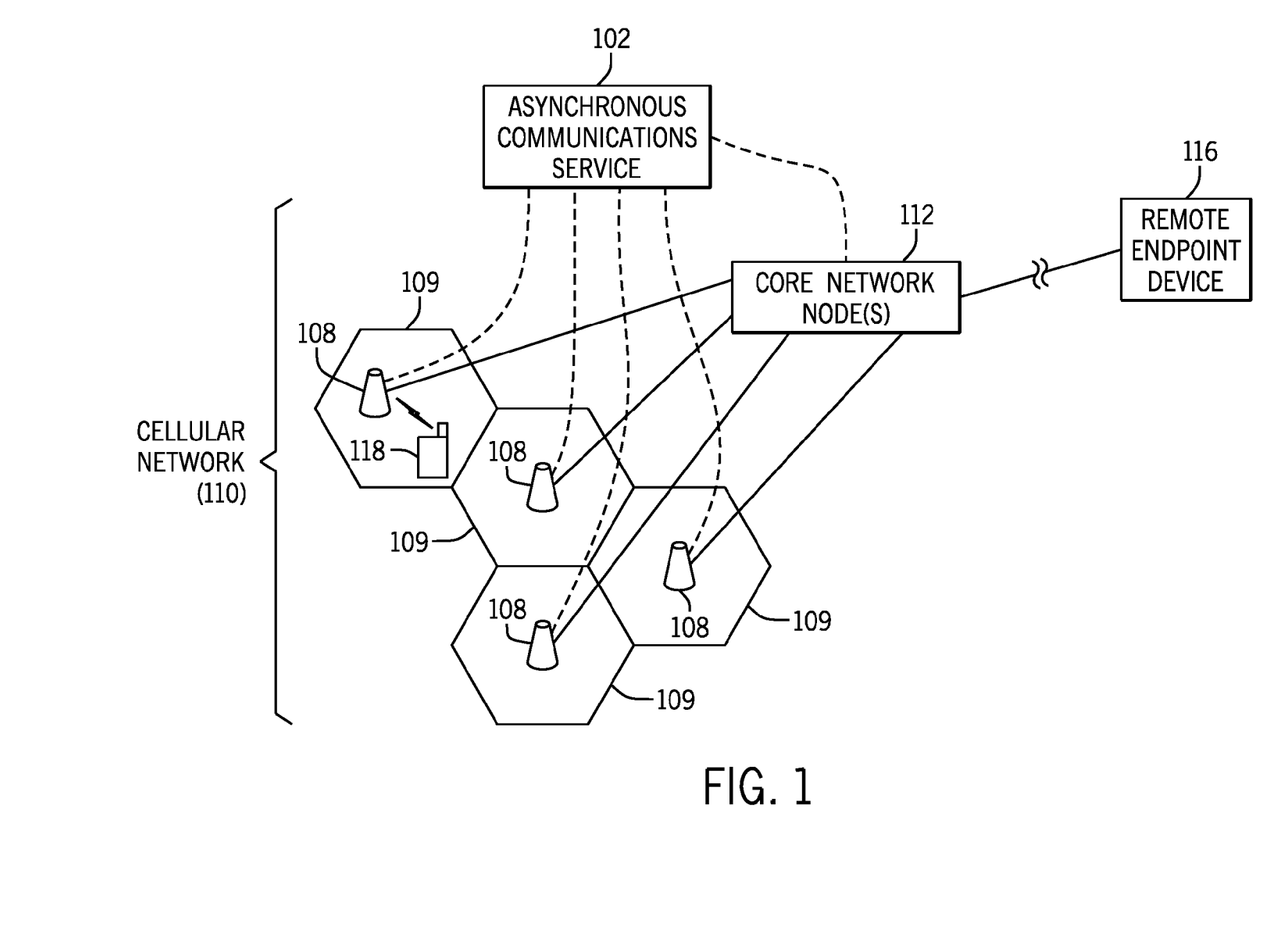
FIG. 1 is a block diagram of an example communications network that includes a cellular network and a backup asynchronous communications service, according to some implementations.

FIG. 1 shows an asynchronous communications service 102 that is operatively coupled to cellular access network nodes 108 of a cellular network 110. A server that is part of or which executes the asynchronous communications service 102 can be directly connected to the cellular access network nodes 108, or alternatively, can be connected indirectly through other nodes (e.g. a gateway, a router, etc.). Although just one asynchronous communications service 102 is depicted in FIG. 1, it is noted that in other examples, more than one asynchronous communications service can be provided.

A server that is part of or which executes the asynchronous communications service 102 is also coupled to core network node(s) 112 that is (are) part of a core network of the cellular network 110. FIG. 1 also shows a remote endpoint device 116 that is coupled to the core network node(s) 112.

Each of the cellular access network nodes 108 is associated with a respective coverage area 109 (also referred to as a "cell"). A UE within a respective cell 109 is able to perform wireless communications with the corresponding cellular access network node 108.

During normal operation of a UE 118 that is in one of the cells 109, the UE 118 establishes a wireless connection with the corresponding cellular access network node 108. The UE 118 can establish a communications session (such as a voice call session) through the cellular network 110 with the remote endpoint device 116. In the communications session, data is carried through a cellular access network node 108 and the core network node(s) to the remote endpoint device 116. The communications session between the UE 118 and the remote endpoint device 116 is a full-duplex communications session in which bi-directional communications between the UE 118 and the remote endpoint device 116 can be performed.

Although the example of FIG. 1 shows just one UE 118, it is noted that there can be multiple UEs in each cell 109. Also, in other examples, the UE 118 can establish a communications session with another UE through the cellular network 110.

In the ensuing discussion, reference is made to a voice call session between the UE 118 and a remote endpoint device (e.g. 116 or another UE), in which voice data is exchanged between the UE 118 and the remote endpoint device. In other examples, a full-duplex communications session between the UE 118 and the remote endpoint device can communicate other types of data (e.g. video data or other data).

In an LTE network, a cellular access network node 108 can be implemented as an enhanced Node B (eNB). Although reference is made to eNBs in the ensuing discussion, it is noted that techniques or mechanisms according to the present disclosure can be applied with other types of cellular access network nodes that operate according to other protocols.

The eNBs of an LTE core network are connected to various core network nodes (e.g. 112 in FIG. 1). As examples, the core network nodes can include a serving gateway (SGW) and a packet data network gateway (PDN-GW). The PDN-GW is the entry and egress point for data communicated between a UE in the LTE network and a packet data network (PDN), e.g. the Internet or another network. The SGW routes and forwards traffic data packets of a UE between the eNB and PDN-GW. The SGW can also act as a mobility anchor for the user plane during handover procedures. The LTE core network nodes can also include a control node referred to as a mobility management entity (MME), which performs various control tasks associated with the LTE network. For example, the MME can perform idle mode mobile device tracking and paging, bearer activation and deactivation, selection of a serving gateway when a mobile device initially attaches to the E-UTRA network, handover of the UE between eNBs, authentication of a user, generation and allocation of a temporary identity to a mobile device, and so forth. In other examples, the MME can perform other or alternative tasks.

The asynchronous communications service 102 supports asynchronous communications between a UE (e.g. the UE 118) and a remote endpoint device (e.g. 116 or another UE). An "asynchronous communications session" refers to a communications session in which data is transmitted in just one direction. Such a communications session can also be referred to as a half-duplex communications session. Asynchronous communications between a first endpoint (e.g. the UE 118) and a second endpoint (e.g. the remote endpoint device 116 or another UE) can involve establishing a first asynchronous communications session (a first half-duplex session) to communicate data from the first endpoint to the asynchronous communications service 102 for delivery to the second endpoint, and also a second asynchronous communications session (a second half-duplex session) to communicate data from the second endpoint to the asynchronous communications service 102 for delivery to the first endpoint.

In accordance with some implementations, even though signal quality between the UE 118 and a corresponding cellular access network node 108 can be poor, which can result in service interruption that prevents a voice call session to proceed for at least some time duration, wireless connections (even intermittent wireless connections) can still be established between the UE 118 and a given cellular access node 108, for communication of data even though a voice call session is not possible.

Using the data session (or data sessions) established between the UE 118 and the given cellular access network node 108, the UE 118 can send voice data over the data session(s) to the asynchronous communications service 102. The asynchronous communications service 102 can then deliver the voice data of the user of the UE 118 to the remote endpoint device 116. Similarly, for delivery of voice data from the remote endpoint device 116 to the UE 118, a data session can be established in which the remote endpoint device 116 sends voice data to the asynchronous communications service 102, which in turn sends the voice data to the UE 118. This type of asynchronous communications of voice data between the UE 118 and the remote endpoint device 116 does not have to rely on a stable wireless connection between the UE 118 and the given cellular access network node 108 to support a full-duplex voice call session between the UE 118 and the remote endpoint device 116.

Figure 2:
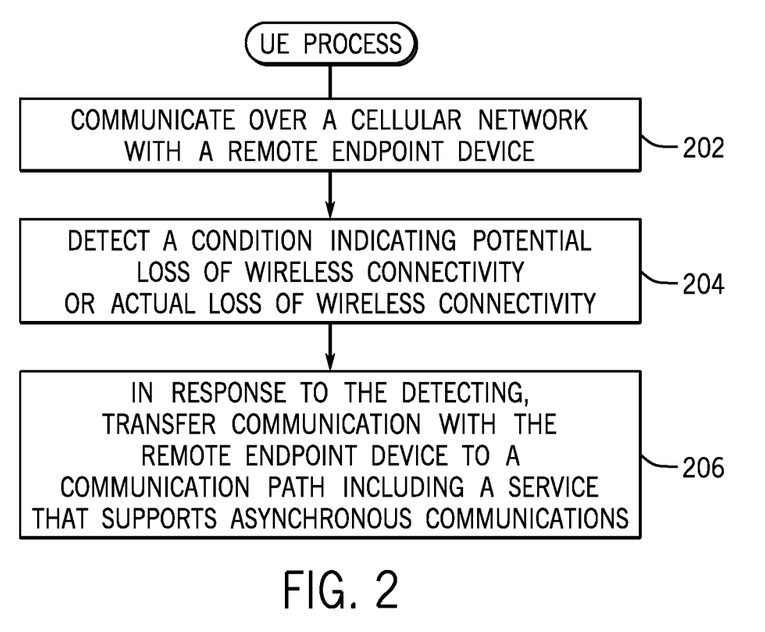
FIG. 2 is a flow diagram of an example process of a user equipment (UE) according to some implementations.

FIG. 2 is a flow diagram of an example process of the UE 118 according to some implementations of the present disclosure. The UE 118 communicates (at 202) over a cellular network (e.g. 110 in FIG. 1) with a remote endpoint device (e.g. 116 or another UE). The communication can be part of a voice call session established between the UE 118 and the remote endpoint device through the cellular network 110. The voice call session can be a full-duplex communications session between the UE 118 and the remote endpoint device 116, where voice data for the voice call session is exchanged in both directions through cellular access network node(s) 108 and the core network node(s) 112.

The UE detects (at 204) a condition indicating potential loss of wireless connectivity or actual loss of wireless connectivity with the cellular network 110, and more specifically with a cellular access network node 108. The detecting performed at 204 can be based on a condition of a wireless signal (or wireless signals) between the UE 118 and the given cellular access network node 108 to which the UE 118 is wirelessly connected. For example, the UE 118 can monitor a condition of a specific downlink wireless signal (or downlink wireless signals) transmitted by the given cellular access network node 108. As examples, in an LTE cellular network 110, the UE 118 can measure the following signal strengths: Reference Symbol Received Power (RSRP) (which provides an average of measured downlink reference signals), Received Signal Strength Indicator (RSSI) (which represents total received wideband power by the UE 118), and so forth. In other examples, other types of measurements can be made by the UE 118.

If a measured signal condition (e.g. signal strength) is below a specified threshold, then the UE 118 can indicate that a condition exists that indicates potential loss of wireless connectivity or actual loss of wireless connectivity. In other examples, actual loss of connectivity can be detected by the UE 118 detecting that a radio link failure has occurred, such as by an inability of the UE to measure a downlink signal sent by the given cellular access network node 108. For example, a UE may be unable to encode a control signal, such as control information in a Physical Downlink Control Channel (PDCCH), or an ability to decode a downlink data signal, e.g. data information in a Physical Downlink Shared Channel (PDSCH).

In other examples, the detection of the condition at 204 can be based on a message received by the UE 118 from the given cellular access network node 108. The cellular access network node 108 may detect the condition indicating potential loss of wireless connectivity or actual loss of wireless connectivity by the UE 118, and in response, the given cellular access network node 108 can send a message to the UE 118 indicating such condition. The UE 118 is able to detect the condition based on receipt of this message from the given cellular access network node 108.

In response to the detecting of the condition indicating potential loss of wireless connectivity or actual loss of wireless connectivity with the cellular network 110, the UE 118 transfers (at 206) communication with the remote endpoint device 116 to a backup communication path including a service that supports asynchronous communications, such as the asynchronous communications service 102. In FIG. 1, the backup communication path includes a cellular access network node 108, the asynchronous communication service 102, and the core network node(s) 112.

In alternative implementations, once a primary communications session (such as a voice call session) is established over the cellular network 110, a backup communications session over a backup path including the asynchronous communications service 102 can also be set up, without waiting for a detection of a condition indicating potential or actual loss of wireless connectivity. In this manner, the quality of the primary communications session through a packet data network gateway (a core network node 112) can be monitored during the full-duplex primary communications session.

If the primary communications session is interrupted at the UE 118, the transfer to the backup communications path can be carried out without any session establishment actions being performed by the UE 118. Quality of service (QoS) procedures can also be put in place to regulate the rate (e.g. bitrate) of the asynchronous communications to compensate for the connection speed available on the UE 118.

Figure 3:
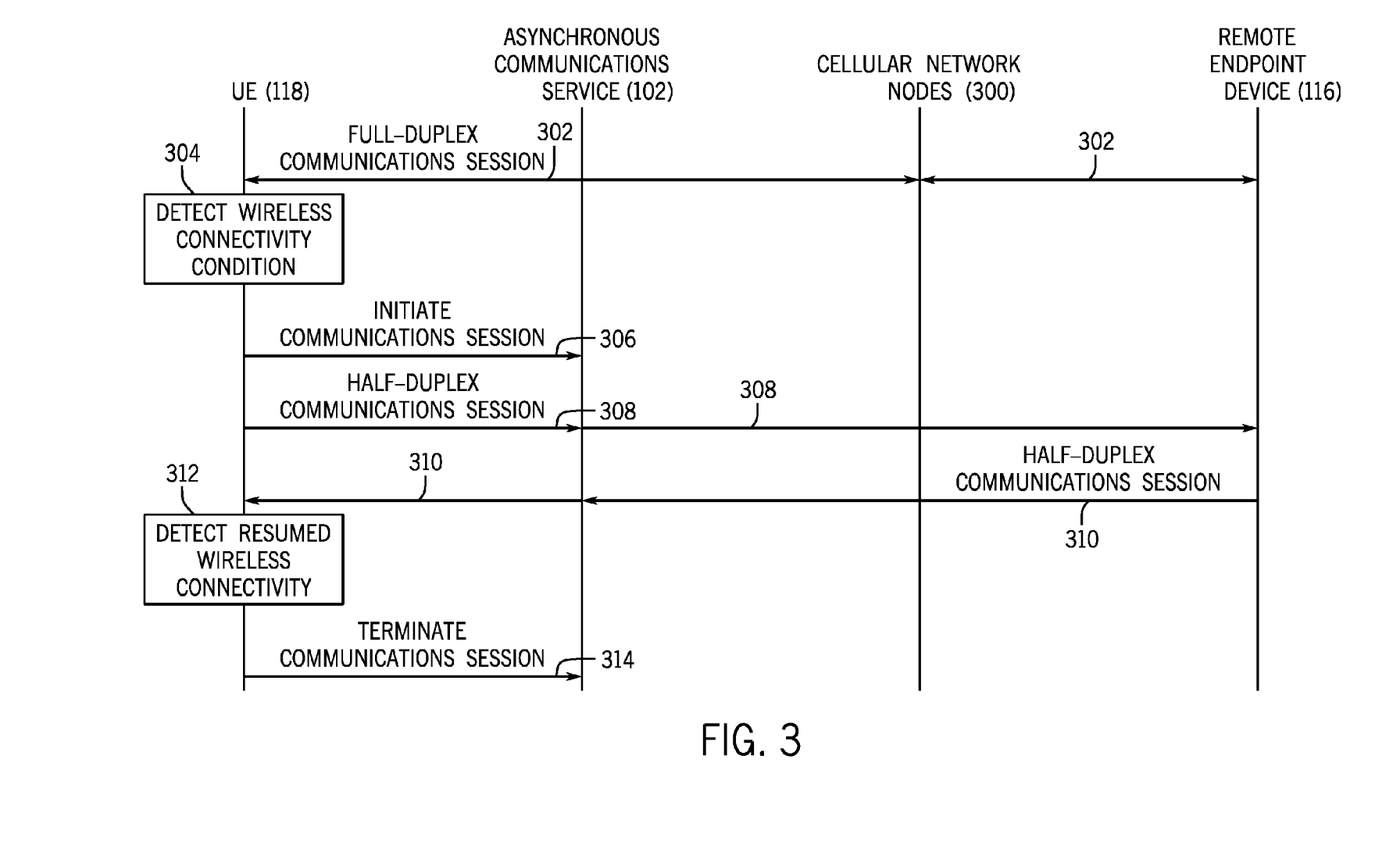
FIG. 3 is a message flow diagram of tasks performed by various nodes, according to further implementations.

FIG. 3 is a message flow diagram of an example process that involves the UE 118, the asynchronous communications service 102, cellular network nodes 300, and the remote endpoint device 116. Initially, the UE 118 can be communicating with the remote endpoint device 116 in a full-duplex communications session 302, which can be a voice call session or other type of communications session. The full-duplex communications session 302 is a session that passes through cellular network nodes 300, including a cellular access network node 108 and core network node 112, such as an SGW and a PDN-GW of an LTE core network.

The UE 118 detects (at 304) a wireless connectivity condition 304, which can be the condition detected at 204 in FIG. 2 that indicates potential loss of wireless connectivity or actual loss of wireless connectivity with the cellular network 110. In response to detecting (at 304) the wireless connectivity condition, the UE 118 initiates (at 306) a communications session with the asynchronous communications service 102. For example, the UE 118 can perform the initiating (at 306) by sending a request to initiate a communications session. The request can be a Session Initiation Protocol (SIP) Invite request, for example. SIP is a communications protocol for signaling and controlling multimedia communications sessions over Internet Protocol (IP) networks. SIP is described in Request for Comments 3261, "SIP: Session Initiation Protocol," dated June 2002. The SIP Invite request is used to initiate a communications session.

In other examples, other messages for initiating a communications session can be sent by the UE 118 to the asynchronous communications service 102. In further examples, instead of the UE 118 initiating the communications session with the asynchronous communications service 102, a cellular network node (e.g. the cellular access network node 108 or a core network node 112), can send a message to the asynchronous communications service 102 to initiate the communications session with the UE 118.

The communications session initiated by the UE 118 (or alternatively by a cellular network node) can be an asynchronous communications session (e.g. a half-duplex communications session). The asynchronous communications service 102 can establish a half-duplex communications session 308 from the UE 118 to the asynchronous communications service 102, in which the asynchronous communications service 102 receives voice data (or other data) from the UE 118, and forwards the received voice data (or other data) to the remote endpoint device 116.

In response to the message initiating the communications session (306 in FIG. 3), the asynchronous communications service 102 can also establish a second half-duplex communications session 310, in which the remote endpoint device 116 can send voice data (or other data) to the asynchronous communications service 102, which then forwards the received voice data (or other data) from the remote endpoint device 116 to the UE 118.

In some examples, in each half-duplex communications session 308 or 310, the user at the UE 118 or the remote endpoint device 116 can make a voice recording at the asynchronous communications service 102, which forwards the voice recording to the other endpoint. A "voice recording" can refer to a recording of voice data that is saved by the asynchronous communications service 102 for later transmission to another entity.

At a later time, the UE 118 can detect (at 312) resumed wireless connectivity. The resumed wireless connectivity can be based on a detected signal strength greater than the specified threshold, or can be based on a message sent by a cellular access network node 108 to the UE 118. In response to detecting the resumed wireless connectivity, the UE 118 can send a message to terminate (at 314) the communications session established with the asynchronous communications service 102. At this point, the asynchronous communications service 102 can tear down the half-duplex communications sessions 308 and 310.

In some implementations, the asynchronous communications service 102 can support voice-over-IP communications, in which voice data (or other data such as video data and so forth) can be communicated in packets over an IP network. Thus, in such examples, in each half-duplex communications session 308 or 310, voice data from the UE 118 or the remote endpoint device 116 can be communicated as VOIP data to the asynchronous communications service 102 for forwarding to the other endpoint.

Figure 4:
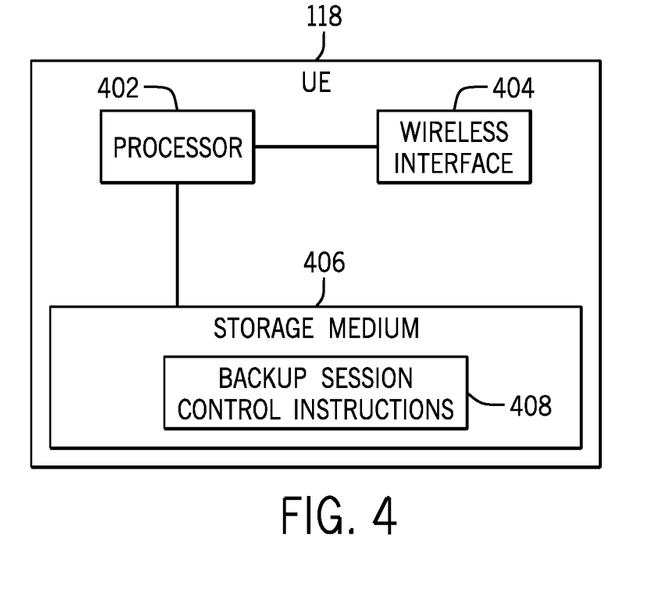
FIG. 4 is a block diagram of an example UE, according to some implementations.

FIG. 4 is a block diagram of an example arrangement of the UE 118, according to some implementations. The UE 118 includes a processor (or multiple processors) 402, which is (are) coupled to a wireless interface 404 to communicate wirelessly with a cellular access network node (e.g. 108 in FIG. 1). The UE 118 also includes a non-transitory machine-readable or computer-readable storage medium (or storage media) 406 that store(s) backup session control instructions 408 that are executable on the processor(s) 402 to perform various tasks as discussed herein, including tasks shown in FIGS. 2 and 3.

Although a network node in the cellular network 110 (such as the cellular access network node 108 or a core network node 112) is not depicted in a figure, it is noted that such a network node can similarly include a processor (or processors), a communication interface to communicate either wirelessly with a UE or with another network node, and a storage medium (or storage media) to store instructions that are executable to perform various tasks discussed herein.

A server that is part of or that executes the asynchronous communications service 102 can also be similarly arranged to include a processor (or processors), a communications interface to communicate with a network node and a UE, and a storage medium (or storage media) storing instructions that are executable to perform various tasks as discussed herein.

A processor can include a microprocessor, a core of a multi-core microprocessor, a microcontroller, a programmable integrated circuit, a programmable gate array, or another hardware processing circuit.

A storage medium (or storage media) can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   communicating, by a wireless device, in a communications session over a cellular network with a remote endpoint device;
   detecting, based on the wireless device measuring a signal strength of a wireless signal transmitted by a cellular access network node of the cellular network, a condition indicating potential loss of wireless connectivity by the wireless device with the cellular network or actual loss of wireless connectivity by the wireless device with the cellular network; and
   in response to the detecting, sending, by the wireless device, a Session Initiation Protocol (SIP) request to a service that supports asynchronous communications to establish a session with the service that supports asynchronous communications, the SIP request causing a transfer of communication with the remote endpoint device to a communication path including a wireless connection with the cellular network, and the service that supports asynchronous communications, the wireless device to communicate wireless signals with the cellular network over the wireless connection, and the transferred communication with the remote endpoint device comprising a communication of data between the wireless device and the remote endpoint device through the communication path including the wireless connection and the service that supports asynchronous communications.

2. The method of claim 1, wherein the communications session is a full-duplex communications session.

3. The method of claim 2, wherein the transfer establishes a half-duplex communications session from the wireless device to the service.

4. The method of claim 3, wherein the transfer further causes establishment of another half-duplex communications session from the service to the remote endpoint device.

5. The method of claim 1, further comprising:
   detecting resumption of wireless connectivity with the cellular network; and
   in response to detecting the resumption of the wireless connectivity with the cellular network, terminating the session with the service.

6. The method of claim 1, wherein the communication path including the wireless connection comprises an intermittent wireless connection between the wireless device and the cellular network.

7. The method of claim 1, wherein the transfer comprises establishing a data session over the wireless connection to send data from the wireless device through the data session to the service.

8. A user equipment (UE) comprising:
   a wireless interface to communicate wirelessly with a cellular network in a first communications session in which data is exchanged between the UE and a remote endpoint device; and
   at least one processor configured to:
      detect, based on measuring a signal strength of a downlink signal from the cellular network, a condition indicating potential loss of wireless connectivity by the UE with the cellular network or actual loss of wireless connectivity by the UE with the cellular network; and
      in response to the detecting, send a Session Initiation Protocol (SIP) request to a service that supports asynchronous communications, the SIP request initiating a second communications session with the service that supports asynchronous communications to provide communication between the UE and the remote endpoint device, the second communications session established with the service over a path that includes a wireless connection between the UE and the cellular network, the UE to communicate wireless signals with the cellular network over the wireless connection.

9. The UE of claim 8, wherein the SIP request is to initiate a half-duplex voice-over-Internet-Protocol (VOIP) communications session.

10. The UE of claim 8, wherein the second communications session is a half-duplex communications session between the UE and the service, and the initiating further causes another half-duplex communications session between the remote endpoint device and the service, and wherein the first communications session is a full-duplex communications session.

11. The UE of claim 8, wherein the data exchanged in the first communications session comprises voice data.

12. An article comprising at least one non-transitory storage medium storing instructions that upon execution cause a wireless device to:
communicate in a first communications session over a cellular network with a remote endpoint device;
detect, based on the wireless device measuring a signal strength of a wireless signal transmitted by the cellular network, a condition indicating potential loss of wireless connectivity by the wireless device with the cellular network or actual loss of wireless connectivity by the wireless device with the cellular network; and
in response to the detecting, send a Session Initiation Protocol (SIP) request to a service that supports asynchronous communications to establish a session with the service that supports asynchronous communications, the SIP request causing a transfer of communication with the remote endpoint device to a communication path including a wireless connection with the cellular network, and the service that supports asynchronous communications in which half-duplex communications is used between the service and the wireless device, the wireless device to communicate wireless signals with the cellular network over the wireless connection, and the transferred communication with the remote endpoint device comprising a communication of data between the wireless device and the remote endpoint device through the communication path including the wireless connection and the service that supports asynchronous communications.

13. The article of claim 12, wherein the transferring comprises initiating a half-duplex communications session between the wireless device and the service.

14. The article of claim 13, wherein the transferring further comprises initiating another half-duplex communications session between the service and the remote endpoint device.

15. The article of claim 12, wherein the transfer comprises establishing a data session over the wireless connection to send data from the wireless device through the data session to the service.

* * * * *